United States Patent

[11] 3,612,995

| [72] | Inventor | Axel Leufgen<br>Muhlheim/Main, Germany |
|---|---|---|
| [21] | Appl. No. | 31,878 |
| [22] | Filed | May 4, 1970 |
| [45] | Patented | Oct. 12, 1971 |
| [73] | Assignee | Dieness-Honeywell-Holding GmbH<br>Frankfurt am Main, Germany |
| [32] | Priority | Sept. 9, 1967 |
| [33] | | Germany |
| [31] | | D 36530/74b Gbm<br>Continuation of application Ser. No.<br>757,336, Sept. 4, 1968, now abandoned. |

[54] APPARATUS FOR ELECTRICALLY MEASURING A CONDITION OF A ROTATING MEMBER
10 Claims, 10 Drawing Figs.

[52] U.S. Cl. .................................................... 324/57 R,
324/127, 336/120
[51] Int. Cl. .................................................... G01r 27/00,
G01r 15/00
[50] Field of Search............................................ 324/127;
340/195; 336/115, 122, 123, 125, 120–121

[56] References Cited
UNITED STATES PATENTS
| 3,317,873 | 5/1967 | Himmelstein et al. ........ | 336/120 |
|---|---|---|---|
| 3,324,724 | 6/1967 | Essers et al. .................. | 340/195 UX |

*Primary Examiner*—Alfred E. Smith

ABSTRACT: The condition, such as the temperature, of a rotating member is electrically measured in an apparatus which comprises a condition responsive impedance rotating with the member and a stationary measuring circuit. A first coil is mounted on the rotating member and is electrically connected to the impedance and a second coil is electrically connected to the circuit. A nonrotating magnetic core for the coils bears the second coil and provides two poles defining a gap therebetween and a closed magnetic circuit surrounding a free air space adjacent the gap. A nonmagnetic annular disc support for the first coil is mounted on the rotating member and extends through the gap so as to place the first coil within the free air space whereby the coils are permanently inductively coupled.

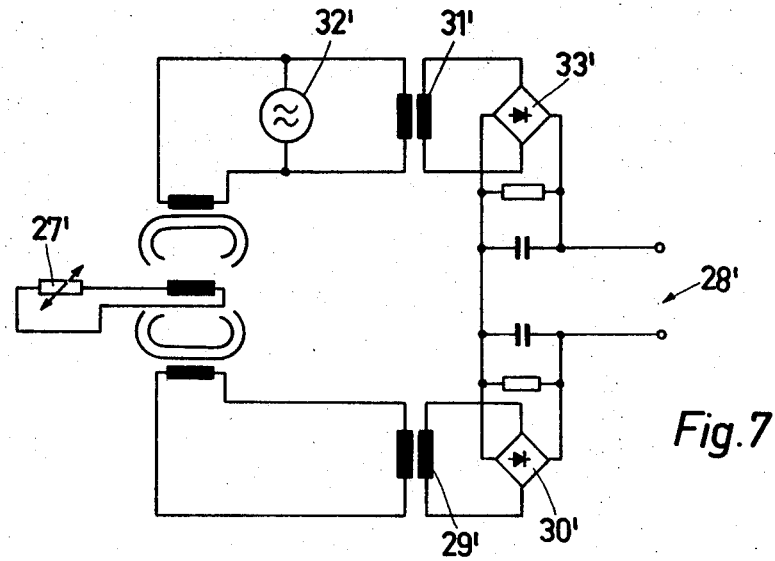
Fig. 7
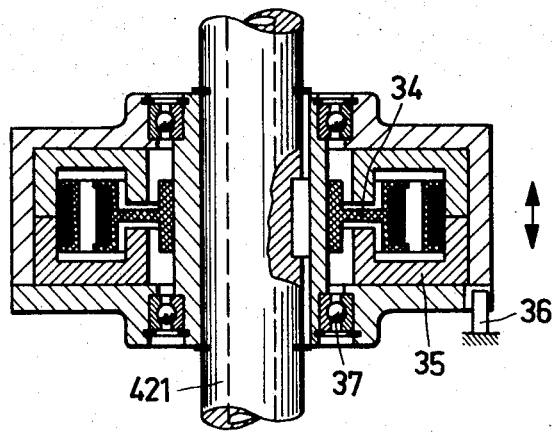
Fig. 8
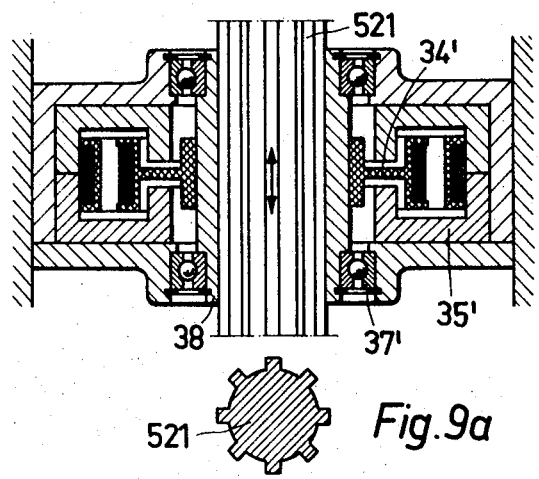
Fig. 9
Fig. 9a
INVENTOR.
AXEL LEUFGEN
BY Kurt Kelman
AGENT

APPARATUS FOR ELECTRICALLY MEASURING A CONDITION OF A ROTATING MEMBER

This is a continuation of Ser. No. 757,336 filed Sept. 4, 1968 now abandoned.

BACKGROUND AND SUMMARY OF THE INVENTION

The present invention relates to the transmission of an electrical signal between a rotating machine part and a fixed machine part without direct contact therebetween and, in particular, to the inductive coupling of a sensor mounted for rotation on the rotating part and means electrically connected with a measuring circuit therefor.

Apparatus of this type is known and enables the measurement and/or control of physical parameters, such as temperatures, of rotating machine parts. In known apparatus making use of the inductive transmittal of the signal produced by the parameter, an alternating current measuring bridge is mounted on the rotating part and one branch of the bridge carries a resistance sensor. In this type of apparatus, a change in the airgap between the rotating and fixed parts substantially influences the transmission of the signal, such a change being unavoidable due to wear in the bearing for the rotating part. This introduces inaccuracies into the system.

It is the primary object of the present invention to overcome this and other disadvantages, and to make the transmission characteristics of the apparatus independent of the changes in the positioning of the rotating part during extended operation, the airgap always remaining unchanged and the apparatus accordingly remaining accurate for purposes of measuring as well as controlling the electrical parameter. The above objects as well as others are accomplished in accordance with the present invention with an apparatus which includes a pair of coils one of which is fixed to a nonrotating magnetic core shaped to have two poles defining the gap therebetween and a closed magnetic circuit surrounding the free air space adjacent the airgap, the other of said coils is fixed to the end of a nonmagnetic support mounted to the rotating member for coaxial rotation therewith. Said support extends through the airgap of the core so as to place the coil within the free airspace surrounding said gap. Thus on rotation of the rotating member the coils are inductively coupled.

BRIEF DESCRIPTION OF DRAWING

The above and other objects, features and advantages of the present invention will become more apparent from the following detailed description of some preferred embodiments thereof, taken in conjunction with the accompanying drawing wherein

FIG. 7 shows a modified circuit diagram;

FIG. 8 is a partial section view of the bearing arrangement of the magnetic system and coil support;

FIG. 9 is a similar view of a modified bearing arrangement; and

FIG. 9a is an end view of the shaft of FIG. 9.

DETAILED DESCRIPTION

In the illustrated embodiments, the invention is shown in connection with electrically heated rolls used for stretching synthetic filaments, bands or films. In such arrangements, the rotating coil carriers or supports are mounted on the shafts of the stretch rolls. Obviously, this invention could be used with other rotating machine parts. In each case, the coil support is mounted on a hollow shaft which serves simultaneously as the rotatable shaft for the rotating part and whose axial bore holds the electrical conductors leading from the indicator of the measured parameter to the coil which rotates with the shaft.

Figure 1:
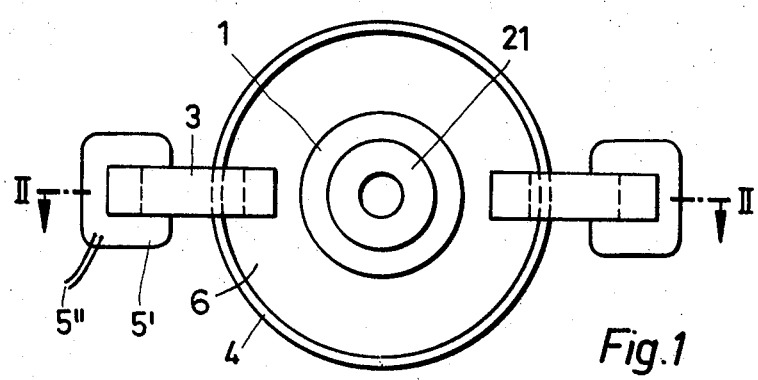
FIG. 1 is a schematic side view of one embodiment of this invention.
Figure 2:
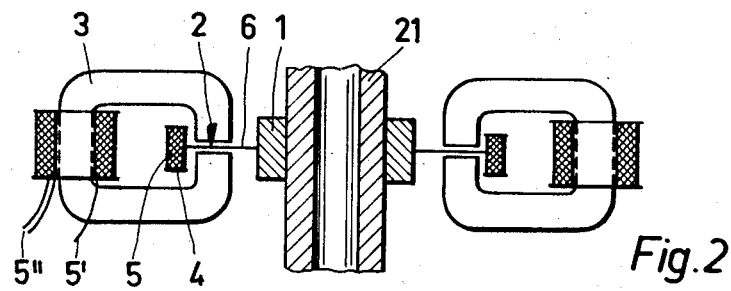
FIG. 2 is a section along line II—II of FIG. 1.

Referring first to the embodiment of FIGS. 1 and 2 There is shown a rotatable hollow shaft 21 whereon there is fixedly mounted by means of a ring 1 an annular disc support 6 for coil 5, carried by a web 4 which is connected to disc 6. The disc 6 extends through the air gap 2 of an iron yoke 3 which forms the core of coil 5'. Thus, the rotating coil is mounted on a support of T-shaped cross section, which extends through the airgap of the fixed magnetic core. Electrical conductors 5" lead from the fixed coil 5' to a measuring circuit to be described hereinafter in connection with FIGS. 6 and 7, the electrical conductors leading through the bore of the shaft to coil 5 not being shown.

In the illustrated embodiment, a pair of like magnetic systems are shown although a single system may be used.

Figure 3:
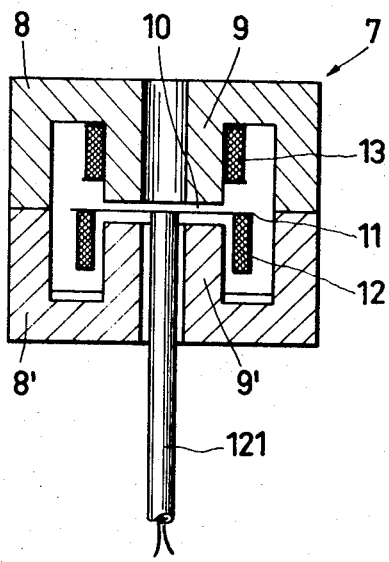
FIGS. 3, 4 and 5 are partial sectional views of three additional embodiments.

In principle, the embodiment of FIG. 3 differs from the above only by the shape of the fixed magnetic core and of the coils. The iron core 7 consists of two like cup-shaped halves 8, 8' fitted together and each having an inwardly projecting central stem 9, 9' defining therebetween airgap 10. The stem 9' of the core defines an axial bore bearing the rotatable shaft 121 whose bore carries the conductors for the rotatable coil 12 carried on disc 11 fixedly mounted on the shaft for rotation therewith. Thus, the rotatable coil 12, which produces the measured parameter, interdigitates with the gaps in the half 8' of the fixed core, which is of E-shaped cross section while the fixed coil 13 (whose conductors are not shown in this figure) is mounted on the stem 9 of the fixed core half 8 which is also of E-shaped cross section.

Figure 4:
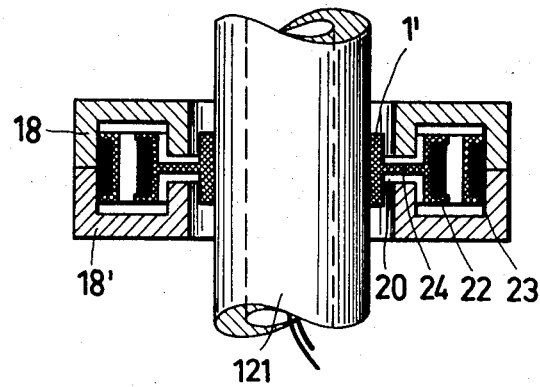

The embodiment of FIG. 4 will be readily understood from the consideration of the previously described embodiments In this case, as in FIG. 3, the fixed iron core consists of two like halves 18, 18' of E-shaped cross section, the rotatable hollow shaft 121 extending through an axial bore in the inwardly extending central stems of the core which define airgap 20. As in FIG. 1, an annular disclike support 1' is fixedly mounted on the shaft for rotation therewith, a web 24 extending from support 1' through airgap 20 to carry the rotatable coil 22 which is spaced from fixed coil 23 mounted on the core.

Figure 5:
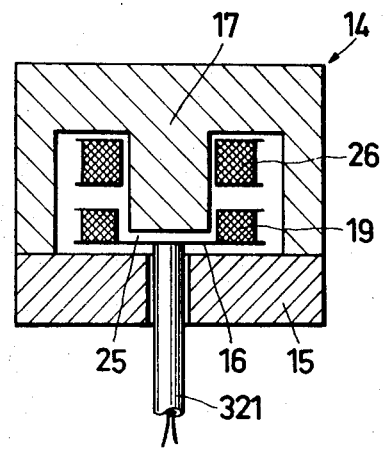

The embodiment of FIG. 5 again differs from the other embodiments only by the shape of the core and the coils. In this case, the fixed core 14 consists of a part of E-shaped cross section having a central stem 17 and a covering plate 15 defining an airgap 25 with the central stem. Similarly to the embodiment of FIG. 3, the rotatable hollow shaft 321 extends through an axial bore in core part 15 and carries the disc support 16 for rotatable coil 19 which delivers the measuring parameter.

Figure 6:
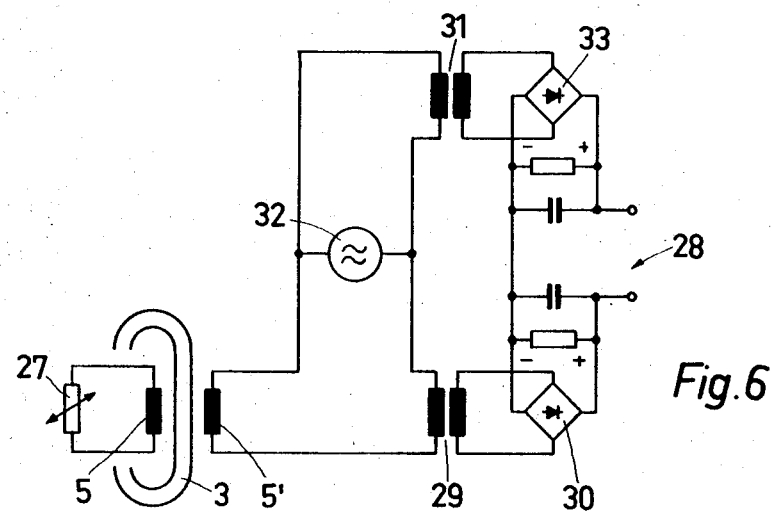
FIG. 6 shows a circuit diagram of the fixed measuring arrangement for the apparatus of FIGS. 1 to 4.

Depending on whether one or two permanent magnetic (iron) cores are used, as indicated in connection with FIGS. 1 and 2, the measuring circuits of FIGS. 6 or 7 may be applied. The measuring circuit according to FIG. 6 may be used in conjunction with the iron core of FIGS. 3 to 5, for instance, while that of FIG. 7 is useful in conjunction with the two iron cores shown in FIGS. 1 and 2. Except for some relatively minor details, the two embodiments of the measuring circuit are alike.

To avoid redundancy, like parts in the two embodiments have been indicated with like numerals, except that they have been provided with a prime in FIG. 7.

As shown, the or each fixed coil is connected in series with a transmitting device 29 (29') whose secondary winding is connected to a rectifier 30 (30'). A comparison voltage reaches the comparison rectifier 33 (33') from the or each fixed coil either directly from generator 32 (32'), which is connected thereto, or via another transmitting device 31 (31') also connected in series.

The generator 32, which is the voltage source for the measuring circuit, is a low-frequency generator.

The rotating coil produces the measured parameter of the part with which it rotates. For instance, when the temperature of the rotating part, i.e., a heated roll, changes, it correspondingly changes the resistance 27 (27') of the coil rotating therewith, which reproduces the measured parameter by changing the impedance of the fixed coil which is inductively coupled to the rotating coil. The current and voltage at transmitting device 29 change accordingly, and the rectified voltage at rectifier 23 is compared with the voltage at rectifier 33 to produce the measuring voltage at terminals 28 (28'). The terminals may be connected to a device calibrated in dependence on resistance 27 so that the measuring voltage may be used either directly to measure the temperature of the rotating part (or any other desired parameter) and/or to control the same.

If the accuracy requirements are not rigid, the comparison rectifier and transmitter may be omitted, and the voltage from rectifier 30 may be used directly to measure or control the temperature of the rotating part.

To limit the play of the rotatable shaft, a separate bearing for the rotor may be provided in a manner exemplified in FIGS. 8 and 9. In this case, the fixed magnetic core of the measuring apparatus is so arranged that it axially and radially follows together with the rotor any displacements of the rotatable shaft.

In the embodiment of the bearing shown in FIG. 8, the coil support 34 is fixedly mounted on rotatable shaft 421 for rotation therewith (as in FIG. 4, for example) while the nonrotatable magnetic system 35, which is inductively coupled to the rotatable system, is mounted axially slidably on shaft 421 by means of roller bearings 37. In this manner, the magnetic system 35 will move with any play occurring in shaft 21 after some time, the electrical and mechanical association of the inductively coupled systems being effected by bearings 37. A pin 36 extends into a fixed housing for the magnetic core, permitting the same axial and radial play.

The same principle is followed in the embodiment of FIG. 9, wherein the magnetic system 35' is fixedly connected with a fixed machine part, while the magnetic system 34' is axially glidably mounted on shaft 521 with some radial play and for rotation therewith, the shaft having a series of circumferentially spaced, longitudinally extending grooves which mate with corresponding wedges of bearing sleeve 38 to which the magnetic system 34' is fixed. Roller bearings 37' are mounted between the two magnetic systems. In function, the two bearing arrangements of FIGS. 8 and 9 are equivalent.

In all the embodiments, the airgap remains constant so that the inductively coupled coils produce a highly accurate transmittal of the measured parameter with simple apparatus.

What is claimed is:

1. Apparatus for electrically measuring a condition of a rotating member comprising, in combination,
   a. a condition responsive impedance means mounted for rotation with the rotating member,
   b. a first coil mounted on the rotating member and electrically connected to said condition responsive impedance means;
   c. a stationary measuring circuit,
   d. a second coil electrically connected to said stationary measuring circuit,
   e. a nonrotating magnetic core for said coils and bearing said second coil, said magnetic core shaped to provide two poles defining an airgap therebetween and a closed magnetic circuit surrounding a free air space adjacent said airgap, and
   f. a nonmagnetic annular disc forming a support for the first coil, said support being mounted on the rotating member for coaxial rotation therewith and having said coil fixed to its peripheral end, said nonmagnetic support extending through the airgap between said magnetic core poles so as to place said first coil within the free air space adjacent thereto whereby the coils are permanently inductively coupled.

2. An apparatus according to claim 1, wherein the condition responsive impedance means is a temperature responsive resistor.

3. The apparatus according to claim 1, wherein the nonmagnetic support extends radially through the airgap formed by the magnetic core poles, and comprises a transverse web fixed to the outer end of said disc, the first coil being mounted on said transverse web.

4. The apparatus according to claim 3, wherein the disc is fixed to the rotating member by means of an annular support ring.

5. Apparatus for electrically measuring a condition of a rotating member comprising, in combination,
   a. a condition responsive impedance means mounted for rotation with the rotating member,
   b. a first coil mounted on the rotating member and electrically connected to said condition responsive impedance means,
   c. a stationary measuring circuit,
   d. a second coil electrically connected to said stationary measuring circuit,
   e. a nonrotating magnetic core for said coils and bearing said second coil, said magnetic core comprising a pair of inwardly projecting central stems providing poles defining an airgap therebetween and two cup-shaped members fitted together to form a closed magnetic circuit surrounding a free air space adjacent said airgap, and
   f. a nonmagnetic support for the first coil, the support comprising a disc coaxially mounted on the rotating member for coaxial rotation therewith, the first coil being fixed to the disc and surrounding one of said central stems spaced therefrom, the second coil surrounding the other central stem, and the support extending through the airgap between said magnetic core poles so as to place said first coil within the free airspace adjacent thereto whereby the coils are permanently inductively coupled.

6. Apparatus for electrically measuring a condition of a rotating member comprising, in combination,
   a. a condition responsive impedance means mounted for rotation with the rotating member,
   b. a first coil mounted on the rotating member and electrically connected to said condition responsive impedance means,
   c. a stationary measuring circuit,
   d. a second coil electrically connected to said stationary measuring circuit,
   e. a nonrotating magnetic core for said coils and bearing said second coil, said magnetic core comprising a cup-shaped member having an inwardly projecting central stem and a cover plate providing two poles defining an airgap therebetween, and a closed magnetic circuit surrounding a free airspace adjacent said airgap, and
   f. a nonmagnetic support for the first coil, the support comprising a disc coaxially mounted on the rotating member for coaxial rotation therewith, the first coil being fixed to the disc and surrounding one end portion of the central stem adjacent the airgap spaced from said one end portion, the second coil surrounding the other end portion of the central stem, and the support extending through the airgap between said magnetic core poles so as to place said first coil within the free air space adjacent thereto whereby the coils are permanently inductively coupled.

7. Apparatus for electrically measuring a condition of a rotating member comprising, in combination,
   a. a condition responsive impedance means mounted for rotation with the rotating member,
   b. a first coil mounted on the rotating member and electrically connected to said condition responsive impedance means,
   c. a stationary measuring circuit,
   d. a second coil electrically connected to said stationary measuring circuit,
   1. one of the coils coaxially surrounding the other coil,
   e. a nonrotating magnetic core for said coils and bearing said second coil, said magnetic core shaped to provide two poles defining an airgap therebetween and a closed magnetic circuit surrounding a free airspace adjacent said airgap, and f. a nonmagnetic annular disc forming a support for the first coil, said support being mounted on the rotating member for coaxial rotation therewith and having said coil fixed to its peripheral end, said nonmagnetic support extending through the airgap between said magnetic core poles so as to place said first coil within the free airspace adjacent thereto whereby the coils are permanently inductively coupled.

8. The apparatus according to claim 7, wherein the magnetic core comprises two cup-shaped members fitted together to form the free space, each cup-shaped member having an inwardly projecting central stem, an airgap is defined between the front surfaces of the two central stems, a support having the form of an annular disc extends through the airgap into the free space and carries the first coil concentrically about but spaced from the central stem, and the second coil concentrically surrounds but is spaced from the other coil.

9. Apparatus for electrically measuring a condition of a rotating member comprising, in combination,
   a. a condition responsive impedance means,
   b. a first coil mounted on the rotating member and electrically connected to said condition responsive impedance means,
      1. the rotating member comprising a rotatable shaft,
   c. a stationary measuring circuit,
   d. a second coil electrically connected to said stationary measuring circuit,
   e. a nonrotating magnetic core for said coils and bearing said second coil, said magnetic core shaped to provide two poles defining an airgap therebetween and a closed magnetic circuit surrounding a free air space adjacent said airgap, and
      2. the nonrotating magnetic core and the second coil being mounted for limited axial and/or radial movement with respect to the shaft,
   f. an antifriction bearing between the shaft and the core, and
   g. a nonmagnetic support for the first coil, said support being mounted on the rotating member for coaxial rotation therewith and having said coil fixed to its peripheral end, said nonmagnetic support extending through the airgap between said magnetic core poles so as to place said first coil within the free air space adjacent thereto whereby the coils are permanently inductively coupled.

10. Apparatus for electrically measuring a condition of a rotating member comprising, in combination,
   a. a condition responsive impedance means,
   b. a first coil mounted on the rotating member and electrically connected to said condition responsive impedance means,
      1. the rotating member comprising a rotatable shaft,
   c. a stationary measuring circuit,
   d. a second coil electrically connected to said stationary measuring circuit,
   e. a nonrotating magnetic core for said coils and bearing said second coil, said magnetic core shaped to provide two poles defining an airgap therebetween and a closed magnetic circuit surrounding a free air space adjacent said airgap, and
      2. the magnetic core and the second coil being stationarily mounted,
   f. a nonmagnetic support for the first coil, said support being mounted on the rotating member for coaxial rotation therewith and having said coil fixed to its peripheral end, said nonmagnetic support extending through the airgap between said magnetic core poles so as to place said first coil within the free air space adjacent thereto whereby the coils are permanently inductively coupled,
      3. the support being mounted on the shaft for limited axial and/or radial movement with respect thereof, and
   g. an antifriction bearing between the support and the magnetic core.